United States Patent

Churchman et al.

Patent Number: 5,901,996
Date of Patent: May 11, 1999

[54] SHOVEL FOOT PLATE ATTACHMENT

[76] Inventors: Fred L. Churchman, 451 Maxine Dr., Baton Rouge, La. 70808; Jacob E. Cloessner, 17012 General Pickett Ave., Baton Rouge, La. 70817

[21] Appl. No.: 08/926,859

[22] Filed: Sep. 10, 1997

[51] Int. Cl.⁶ .................................................. A01B 1/00
[52] U.S. Cl. .............................................................. 294/60
[58] Field of Search ........................ 294/49, 59, 60; 172/378, 380; 254/131.5, 132

[56] References Cited

U.S. PATENT DOCUMENTS

| | | | |
|---|---|---|---|
| 310,567 | 1/1885 | Elliott | 294/60 |
| 332,132 | 12/1885 | Anthony . | |
| 493,110 | 3/1893 | Orthwein | 294/60 |
| 536,230 | 3/1895 | Page . | |
| 648,321 | 4/1900 | Westerberg | 294/60 |
| 648,804 | 5/1900 | Sheehan | 294/60 |
| 754,543 | 3/1904 | Christiansen | 294/60 |
| 1,018,424 | 2/1912 | Jewett | 294/60 |
| 1,098,460 | 6/1914 | Reeder | 294/60 |
| 1,136,754 | 4/1915 | Arnow . | |
| 1,198,930 | 9/1916 | Krentel . | |
| 1,331,495 | 2/1920 | Gibson . | |
| 3,047,328 | 7/1962 | Mumma | 294/59 |
| 5,503,445 | 4/1996 | Fontaine | 294/60 |

*Primary Examiner*—Dean Kramer
*Attorney, Agent, or Firm*—Joseph N. Breaux

[57] ABSTRACT

A shovel foot plate attachment that includes a left foot plate, a right foot plate, an anti-rotation alignment flange, and a handle connecting member; the left and right foot plates being positioned adjacent to each other with the handle connecting member extending away from the left and right foot plates; the anti-rotation alignment flange extending away from back side edges of the left and right foot plates; the handle connecting member having a receiving channel formed therein for receiving a section of the shovel in a manner such that when the section of the shovel is positioned within the receiving channel the left foot plate is in contact with the left shoulder of the shovel and the right foot plate is in contact with the right shoulder of the shovel.

5 Claims, 2 Drawing Sheets

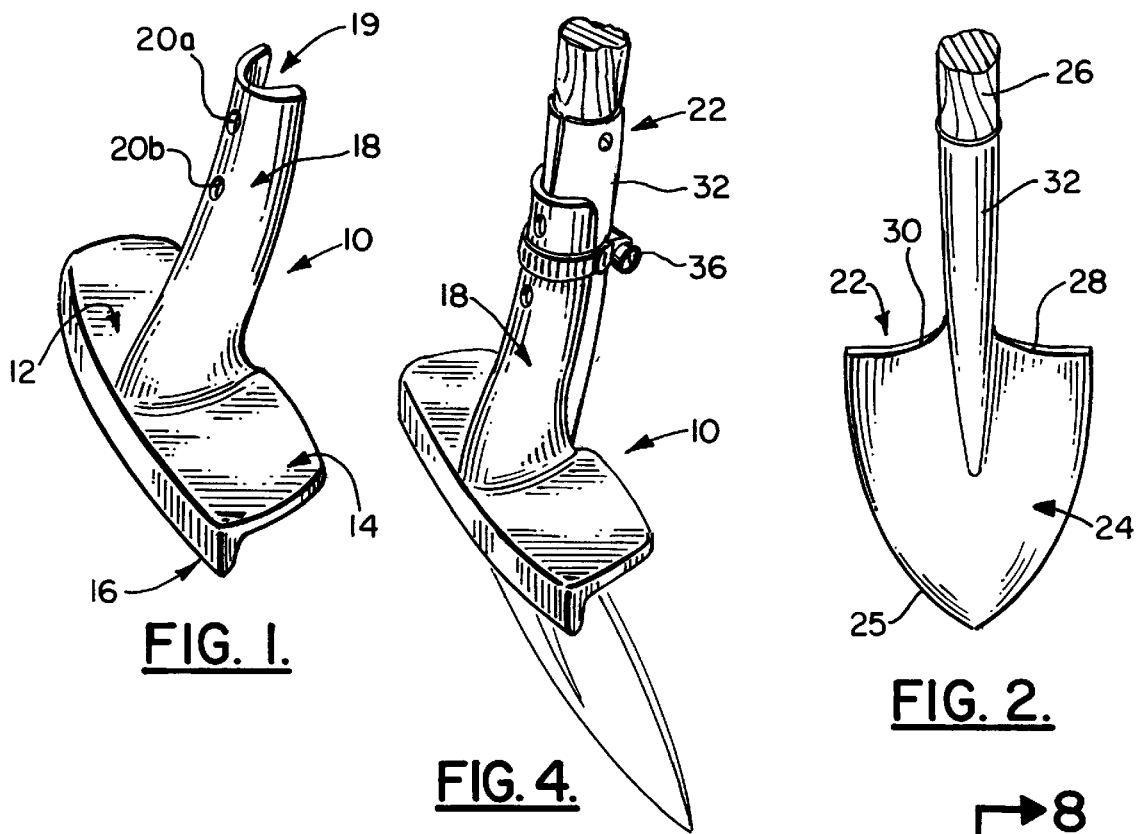
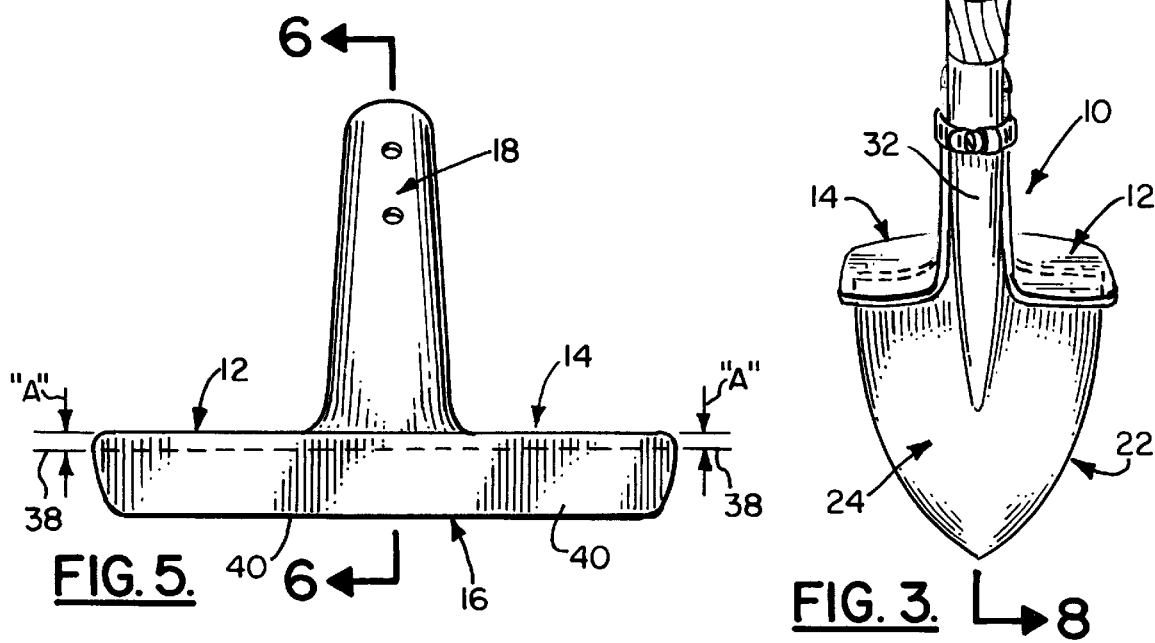

SHOVEL FOOT PLATE ATTACHMENT

TECHNICAL FIELD

The present invention relates to shovels, spades, trenchers and other foot assisted digging tools that have left and right shoulders formed adjacent to a scoop portion for receiving digging forces from the sole of the user's foot and more particularly to a shovel foot plate attachment having at least one foot plate and preferably a left foot plate, a right foot plate; an anti-rotation alignment flange, and a handle connecting member; the anti-rotation alignment flange extending away from back side edges of the left and right foot plates; the handle connecting member having a receiving channel formed therein for receiving a section of the shovel in a manner such that when the section of the shovel is positioned within the receiving channel the left foot plate is in contact with the left shoulder of the shovel and the right foot plate is in contact with the right shoulder of the shovel; the receiving channel being partially defined by an interior shovel contacting surface.

BACKGROUND OF THE INVENTION

Many lawn and garden digging jobs require the use of a digging tool such as a shovel, a spade, or other foot assisted digging tool. These foot assisted digging tools typically have an elongated handle terminating at one end in a scoop portion that is provided with an insertion edge at a far end of thereof and relatively narrow left and right shoulders at the opposite, handle end thereof. In use, the elongated handle is used to position the insertion edge onto the desired location and the insertion edge is driven into the ground by a force applied by the sole of the user's shoe onto either the left or the right shoulder of the scoop portion. A problem encountered with this digging arrangement is the typical need for the user to have a shoe provided with a very thick sole, such as a boot, to comfortably apply the force necessary to drive the insertion edge of the scoop portion of the foot assisted digging tool into the ground. Although boots and other heavy soled shoes are generally readily available, it can often be undesirable to replace light soled shoes, such as sandals or athletic shoes, when only a small amount of digging is necessary. It would be desirable, therefore, to have an attachment, that was securable to a foot assisted digging tool and that included relatively broad and flat left and right foot plates that were positionable, respectively, over the left and right shoulders of the foot assisted digging tool to allow the user to comfortably dig in the lawn or garden while wearing thin soled shoes or even no shoes at all. Because foot assisted digging tools are built in a variety of configurations, it would be desirable to have an attachment that included a handle connecting member in connection with a left and a right foot plate wherein the handle connecting member includes a receiving channel formed therein for receiving a section of the foot assisted digging tool in a manner such that when the section of the foot assisted digging tool is positioned within the receiving channel a left foot plate of the attachment is in contact with the left shoulder of the foot assisted digging tool and a right foot plate is in contact with the right shoulder of the foot assisted digging tool.

SUMMARY OF THE INVENTION

It is thus an object of the invention to provide a shovel foot plate attachment that is securable to a foot assisted digging tool and that includes broad and flat left and right foot plates that are positionable, respectively, over the left and right shoulders of the foot assisted digging tool.

It is a further object of the invention to provide a shovel foot plate attachment that includes a handle connecting member in connection with a left and a right foot plate wherein the handle connecting member includes a receiving channel formed therein for receiving a section of the foot assisted digging tool.

It is a still further object of the invention to provide a shovel foot plate attachment having a left foot plate, a right foot plate, an anti-rotation alignment flange, and a handle connecting member; the left and right foot plates being positioned adjacent to each other with the handle connecting member extending away from the left and right foot plates; the anti-rotation alignment flange extending away from back side edges of the left and right foot plates; the handle connecting member having a receiving channel formed therein for receiving a section of the shovel in a manner such that when the section of the shovel is positioned within the receiving channel the left foot plate is in contact with the left shoulder of the shovel and the right foot plate is in contact with the right shoulder of the shovel; the receiving channel being partially defined by an interior shovel contacting surface.

It is a still further object of the invention to provide a shovel foot plate attachment that accomplishes some or all of the above objects in combination.

Accordingly, a shovel foot plate attachment is provided. The shovel foot plate attachment includes at least one foot plate; and a handle connecting member; the at least one foot plate being positioned in connection with the handle connecting member, the handle member extending away from the at least one foot plate; the handle connecting member having a receiving channel formed therein for receiving a section of the shovel in a manner such that when the section of the shovel is positioned within the receiving channel at least one foot plate is in contact with a shoulder of the shovel; the receiving channel being partially defined by an interior shovel contacting surface. In a preferred embodiment, the shovel foot plate attachment includes a left foot plate, a right foot plate, an anti-rotation alignment flange, and a handle connecting member; the handle connecting member being positioned between the left and right foot plates and extending away from the left and right foot plates; the anti-rotation alignment flange extending away from back side edges of the left and right foot plates; the handle connecting member having a receiving channel formed therein for receiving a section of the shovel in a manner such that when the section of the shovel is positioned within the receiving channel the left foot plate is in contact with the left shoulder of the shovel and the right foot plate is in contact with the right shoulder of the shovel; the receiving channel being partially defined by an interior shovel contacting surface. The handle connecting member preferably extends away from the left and right foot plates in a manner such that the left and right foot plates are each oriented at angles of between negative twenty and positive twenty degrees with respect to a first reference plane oriented normal to the longitudinal axis of the handle connecting member. In another preferred embodiment, the exteriorly facing surface of the handle connecting member is provided with fastener receiving structures formed therein for receiving at least a portion of a fastener used to secure the handle connecting member to the shovel. The fastener receiving structures preferably include a pair of screw apertures. The fastener receiving structures preferably also include a pair of ridges that partially define at least one clamp channel that is sized to receive a portion of the band of a hose clamp. In another preferred embodiment, the interior shovel contacting surface of the receiving channel includes a first contact surface oriented at an angle of between thirty and ninety degrees with respect to one of the left and right foot plates and a second shovel contact surface oriented at an angle of between forty and one-hundred-twenty degrees with respect to the same one of the left and right foot plates.

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein:

FIG. 1 is a perspective view of a first exemplary embodiment of the shovel foot plate attachment of the present invention showing the left foot plate, the right foot plate, the anti-rotation alignment flange, and the shovel handle connecting member with the two optional mounting holes.

FIG. 2 is a plan view of a representative shovel of the type with which the shovel foot plate attachment of the present invention is used showing the metal shovel scoop portion including the insertion edge, the left shoulder, the right shoulder, and the handle securing flange; and the elongated shovel handle.

FIG. 3 is a front plan view of the first exemplary shovel foot plate attachment of FIG. 1 mounted onto the representative shovel of FIG. 2 showing the handle securing flange held within the receiving channel of the shovel handle connecting member by a metal hose clamp, and the left and right foot plates positioned over the left and right shoulders of the shovel scoop portion.

FIG. 4 is a perspective view of the first exemplary shovel foot plate attachment of FIG. 1 mounted onto the representative shovel of FIG. 2 showing the handle securing flange held within the receiving channel of the curved shovel handle connecting member by a metal hose clamp, and the left and right foot plates positioned over the left and right shoulders of the shovel scoop portion.

FIG. 5 is a backside plan view of the first exemplary embodiment of the shovel foot plate attachment of FIG. 1 showing the left and right foot plates each oriented at an angle "A" of zero degrees with the respect to a plane crossing the longitudinal axis of the shovel handle connecting member; the anti-rotation alignment flange extending away from and formed along the back side edges of the left and right foot plates; and the shovel handle connecting member with the two optional mounting holes.

DESCRIPTION OF THE EXEMPLARY EMBODIMENT

Figure 9:
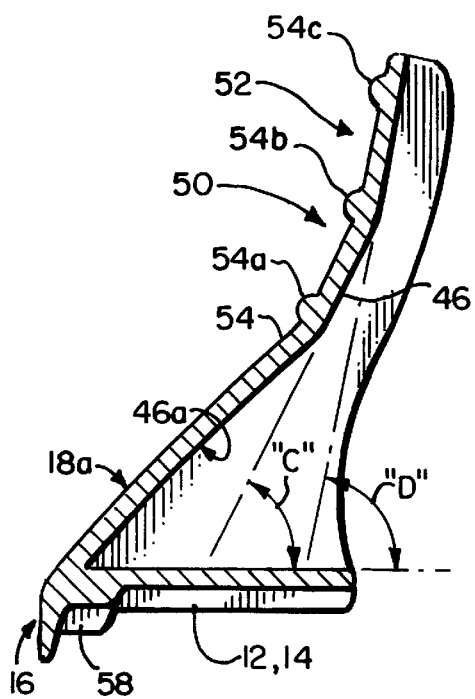
FIG. 9 is a cross sectional view of a second exemplary embodiment of the shovel foot plate attachment of the present invention that includes a shovel handle connecting member having an interior shovel contacting surface provided with a first shovel contact surface oriented at an angle "C" of sixty-seven degrees with respect to one of the foot plates; a second shovel contact surface oriented at an angle "D" of eighty degrees with respect to one of the foot plates; a first clamp retaining notch formed on the outer surface of the shovel handle connecting member adjacent to the first shovel contact surface; and a second clamp retaining notch formed on the outer surface of the shovel handle connecting member adjacent to the second shovel contact surface.

FIG. 1 shows a first exemplary embodiment of the shovel foot plate attachment of the present invention generally designated by the numeral 10. In this embodiment, shovel foot plate attachment 10 includes a left foot plate, generally designated 12; a right foot plate, generally designated 14; an anti-rotation alignment flange, generally designated 16; and a shovel handle connecting member, generally designated 18. Left foot plate 12, right foot plate 14, anti-rotation alignment flange 16, and shovel handle connecting member 18 are integrally molded of a high strength plastic. Shovel handle connecting member 18 includes a shovel receiving channel 19 and two optional mounting holes 20a, 20b. In this embodiment, mounting hole 20a is sized to fit over a convention display hook of a sales display.

With reference to FIG. 2, in use, shovel foot plate attachment 10 (FIG. 1) is used with conventional foot assisted digging tools such as a shovel, generally designated 22. Shovel 22 includes a metal shovel scoop portion, generally designated 24, and an elongated wooden handle 26. Shovel scoop portion 24 includes an insertion edge 26, a left shoulder 28, a right shoulder 30, and a handle securing flange 32. With reference to FIG. 3, first exemplary shovel foot plate attachment 10 is mounted onto shovel 22 by positioning a section of handle securing flange 32 into shovel receiving channel 19 (FIG. 1) in a manner such that left and right foot plates 12,14 are positioned over left and right shoulders 28, 30 (FIG. 2) of shovel scoop portion 24. With reference to FIG. 4, shovel foot plate attachment 10 is then secured to shovel 22 by placing a conventional screw type metal hose clamp 36 around handle securing flange 32 and handle connecting member 18 and tightening hose clamp 36. If desired conventional wood screws, bolts or nails can be positioned through optional mounting holes 20a,20b and into handle securing flange 32 if a more secure attachment is desired.

Figure 8:
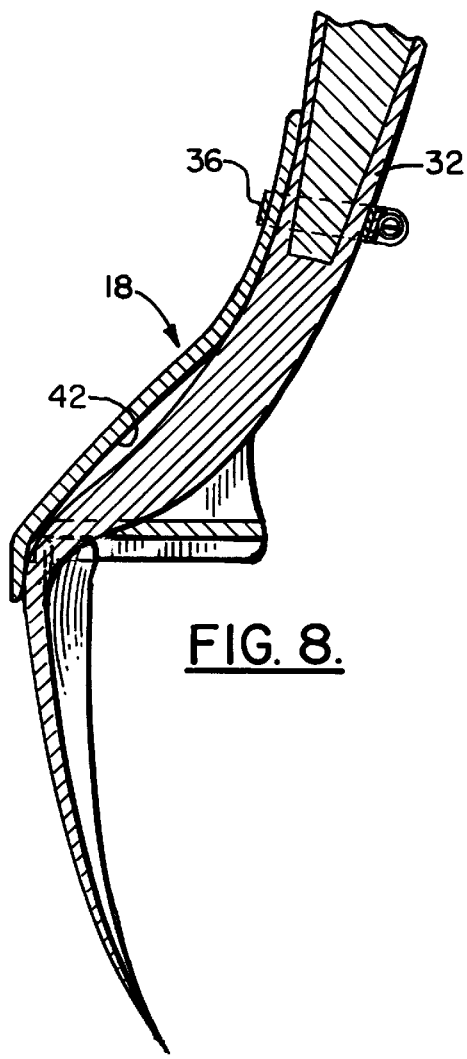
FIG. 8 is a cross-sectional view of the shovel foot plate attachment and representative shovel of FIG. 3 along the Line II—II showing the handle securing flange secured against the curved interior shovel contacting surface of the shovel handle connecting member by the hose clamp and the shovel contacting surface of a section of the anti-rotation alignment flange contacting the back surface of the scoop portion of the shovel.
Figure 6:
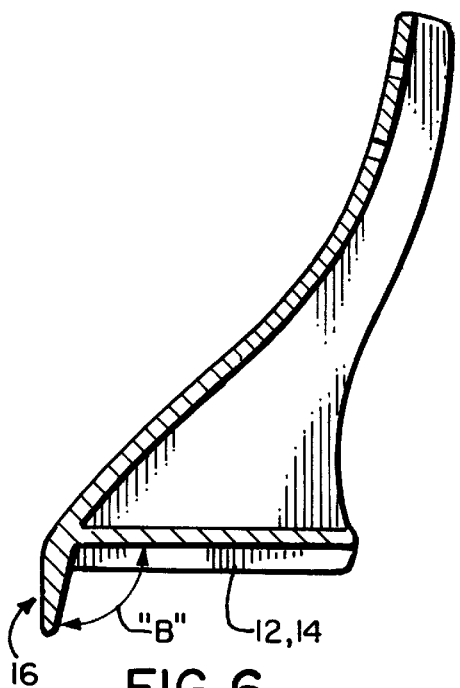
FIG. 6 is a cross sectional view of the first exemplary embodiment of the shovel foot plate attachment of FIG. 5 along the line I—I showing the underside of the left foot plate, a section of the anti-rotation alignment flange extending away from underside of the left foot plate by an angle "B" of ninety-two degrees; and the curved interior shovel contacting surface of the shovel handle connecting member with the two optional mounting holes.
Figure 7:
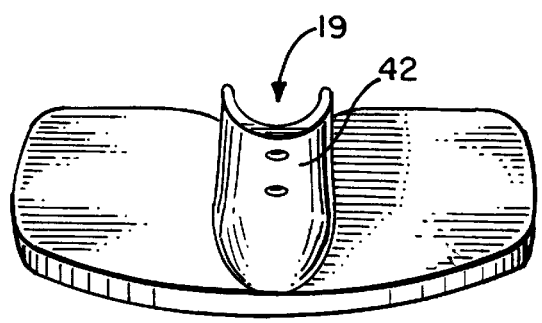
FIG. 7 is an underside plan view of the shovel foot plate attachment of FIG. 6 showing the receiving channel of the curved shovel handle connecting member, the underside surfaces of the left and right foot plates, and the shovel contacting surface of the anti-rotation alignment flange.

With reference now to FIG. 5, in this embodiment, left and right foot plates 12,14 are each oriented at an angle "A" of zero degrees with the respect to a geometric plane, (designated by dashed line 38), crossing the longitudinal axis of shovel handle connecting member 18. (Although an angle "A" of zero degrees is used in this embodiment, an angle "A" of between negative twenty and positive twenty degrees can be used without departing from the spirit and scope of the invention taught herein.) Anti-rotation alignment flange 16 extends away from the back side edges 40 of left and right foot plates 12,14. With reference to FIG. 6, anti-rotation alignment flange 16 is oriented at an angle "B"

of ninety-three degrees with respect to left and right foot plates 12,14. FIG. 7 shows receiving channel 19 partially defined by a curved interior shovel contacting surface 42. With reference to FIG. 8, interior shovel contacting surface 42 is curved sufficiently to allow at least a section of interior shovel contacting surface 42 to contact handle securing flange 32 when hose clamp 36 is secured around handle securing flange 32 and handle connecting member 18. With reference to FIG. 9, if desired a second exemplary handle connecting member 18A can be substituted for handle connecting member 18 (FIG. 3) if desired. In this embodiment, interior shovel contacting surface 42A includes a first planar shovel contact surface 46 that is oriented at an angle "C" of sixty-seven degrees with respect to a foot plate 12,14; and a second planar shovel contact surface 48 that is oriented at an angle "D" of eighty degrees with respect to a foot plate 12,14. Handle connecting member 18A also includes first and second clamp retaining notches 50,52 that are formed on the outer surface 54 of handle connecting member 18A adjacent, respectively, to first planar shovel contact surface 46 and second planar shovel contact surface 48. First and second clamp retaining notches 50, 52 are partially formed by three ridges 54a–c. Additionally, in this embodiment, the underside surfaces of foot plates 12,14 each include a thickened shovel shoulder contact ledge 58 that is integrally formed with foot plates 12,14 and anti-rotation alignment flange 16. Shovel shoulder contact ledge 58 is used to adapt the angle of the contacting surface to an angle selected in a manner to maximize the number of shovel types with which the foot plate attachment of the present invention can be utilized.

It can be seen from the preceding description that a shovel foot plate attachment has been provided that is securable to a foot assisted digging tool; that includes broad and flat left and right foot plates that are positionable, respectively, over the left and right shoulders of a foot assisted digging tool; that includes a handle connecting member in connection with a left and a right foot plate wherein the handle connecting member includes a receiving channel formed therein for receiving a section of the foot assisted digging tool; and that includes a left foot plate, a right foot plate, an ante-rotation alignment flange, and a handle connecting member; the left and right foot plates being positioned adjacent to each other with the handle connecting member extending away from the left and right foot plates; the anti-rotation alignment flange extending away from back side edges of the left and right foot plates; the handle connecting member having a receiving channel formed therein for receiving a section of the shovel in a manner such that when the section of the shovel is positioned within the receiving channel the left foot plate is in contact with the left shoulder of the shovel and the right foot plate is in contact with the right shoulder of the shovel; the receiving channel being partially defined by an interior shovel contacting surface.

It is noted that the embodiment of the shovel toot plate attachment described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A shovel foot plate attachment for a shovel having a shovel handle attached to a shovel scoop portion that includes an insertion edge, a left shoulder and a right shoulder, said shovel foot plate attachment comprising:

at least one foot plate; and a handle connecting member;

said at least one foot plate being in connection with said handle connecting member;

said handle connecting member extending away from said at least one foot plate;

said handle connecting member having a receiving channel formed therein for receiving a section of the shovel in a manner such that when the section of the shovel is positioned within said receiving channel at least one foot plate is in contact with a shoulder of the shovel;

said receiving channel being partially defined by an interior shovel contacting surface;

said interior shovel contacting surface of said receiving channel including a first planar contact surface and a second planar contact surfaces;

said handle connecting member further including first and second clamp retaining notches formed between three ridges formed on an outer surface of said handle connecting member;

said first clamp retaining notch being formed adjacent to said first planar shovel contact surface;

said second clamp retaining notch being formed adjacent to said second planar shovel contact surface.

2. The shovel foot plate attachment of claim 1, wherein:

said first planar contact surface of said interior shovel contacting surface is oriented at an angle of between thirty and ninety degrees with respect to said at least one foot plate.

3. The shovel foot plate attachment of claim 2 wherein:

said second planar contact surface of said interior shovel contacting surface is oriented at an angle of between forty and one-hundred-twenty degrees with respect to said at least one foot plate.

4. The shovel foot plate attachment of claim 1 wherein:

said second planar contact surface of said interior shovel contacting surface is oriented at an angle of between forty and one-hundred-twenty degrees with respect to said at least one foot plate.

5. A shovel foot plate attachment for a shovel having a shovel handle attached to a shovel scoop portion that includes an insertion edge, a left shoulder and a right shoulder, said shovel foot plate attachment comprising:

a left foot plate;

a right foot plate;

an anti-rotation alignment flange; and a handle connecting member;

said handle connecting member being positioned between said left and right foot plates and extending away from said left and right foot plates;

said anti-rotation alignment flange extending away from back side edges of said left and right foot plates;

said handle connecting member having a receiving channel formed therein for receiving a section of the shovel in a manner such that when the section of the shovel is positioned within said receiving channel said left foot plate is in contact with the left shoulder of the shovel and said right foot plate is in contact with the right shoulder of the shovel;

said receiving channel being partially defined by an interior shovel contacting surface;

said left plate having a left underside surface;

said right plate having a right underside surface;

said left underside surface having a left shovel shoulder contact ledge formed thereon that is integrally formed with said left foot plate and said anti-rotation alignment flange;

said right underside surface having a right shovel shoulder contact ledge formed thereon that is integrally formed with said right foot plate and said anti-rotation alignment flange.

* * * * *